March 31, 1970   R. L. EASTMAN   3,503,451
FLUID ACTUATED MARKER ELEMENT FOR TRACTORS AND THE LIKE
Filed Nov. 28, 1967   3 Sheets-Sheet 1
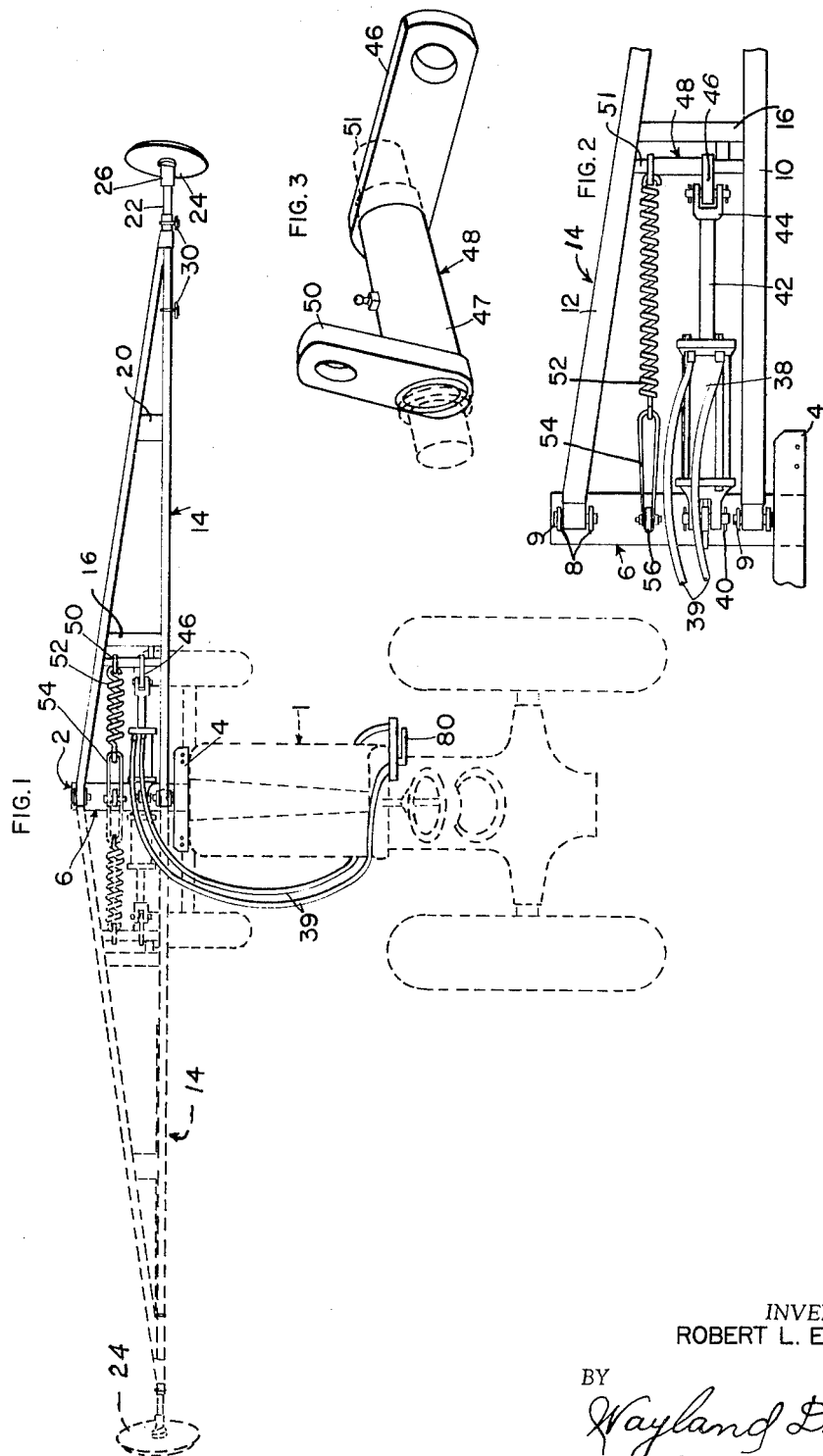
INVENTOR.
ROBERT L. EASTMAN
BY
Wayland D. Keith
HIS AGENT

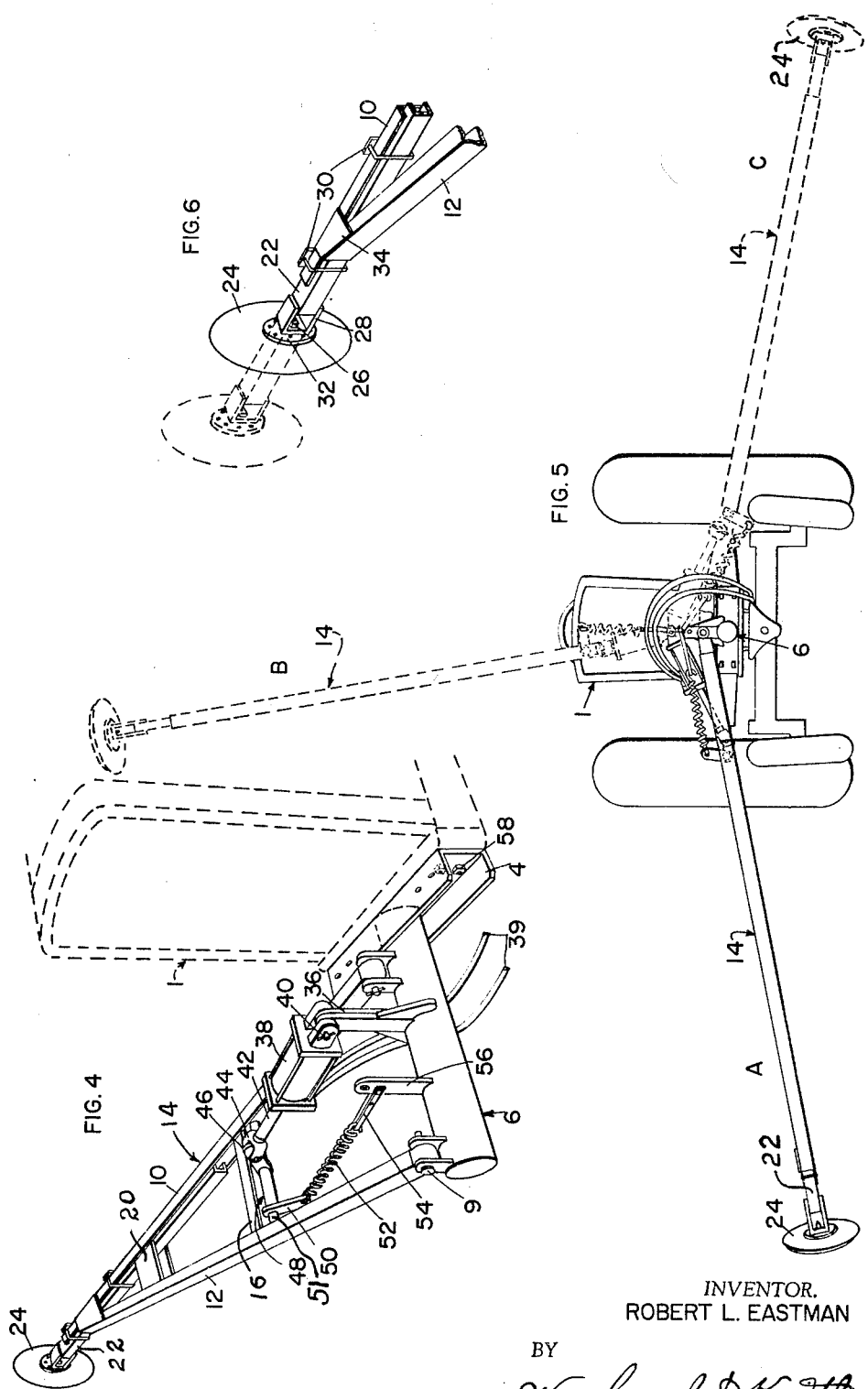

ROBERT L. EASTMAN
*INVENTOR.*

BY
Wayland D. Keith
HIS AGENT

United States Patent Office 3,503,451
Patented Mar. 31, 1970

3,503,451
FLUID ACTUATED MARKER ELEMENT
FOR TRACTORS AND THE LIKE
Robert L. Eastman, P.O. Box 127,
Randlett, Okla. 73562
Filed Nov. 28, 1967, Ser. No. 686,101
Int. Cl. A01b 69/02
U.S. Cl. 172—132          7 Claims

ABSTRACT OF THE DISCLOSURE

A row marker for a tractor or a tractor operated implement, which is mounted on the tractor or implement along the longitudinal axis of the tractor, with a pivoted arm and an adjustable extension thereon with ground engaging marker element such as a disc, on the adjustable extension, which will mark on either side of the tractor. A fluid actuated cylinder is provided to move the arm of the marker from an outwardly extending position on one side of the longitudinal axis of the tractor, upward to a point near the dead top center, whereupon, the inertia, together with the tension of a spring biased between a bell crank mechanism and the row marker arm, will cause the row marker arm to be carried over dead top center and the fluid actuated cylinder, which is actuated by remote control, may be used as a retarding element to gently lower the row marker into place on the opposite side of the tractor. The spring may be utilized as a balance to partially support the row marker arm or may be used to cause the row marker element to engage the earth to the desired extent. The row marker element is remotely controlled by the operator, from the seat of the tractor.

---

This invention relates to row markers, and more particularly to row markers for use with tractors or tractor operated implements.

Various row markers have been proposed heretofore, but these, for the most part, required two sets of operating mechanisms, and were not adaptable either for use on the forward end of the tractor or the rear of a tillage implement, such as a planter or the like. Other instances make it desirable to mark the land, to enable the plowing of furrows or listing in spaced relation with respect to other furrows or rows, as the tractor and implement move across the field.

The present row marker is adaptable to various implements and tractors for use either on the forward end of the tractor or rearwardly of an implement which is attached to the tractor, which row marker may be adjusted to accommodate the different width marking for rows, furrows and the like.

The present row marker is mounted medially of the tractor or implement and is selectively movable from side to side, thereby enabling the use of a single arm or outwardly extending beam to mark the terrain on either side of the tractor or implement.

An object of this invention is to provide a row marker for a tractor or implement which marker may be selectively moved from one side to the other at the will of the operator, by fluid actuated power means.

Another object of the invention is to provide a row marker for a tractor or implement which may be readily attached to the tractor medially of longitudinal axis thereof or readily detached therefrom and which may be readily attached to an implement by adapter members and may be readily removed therefrom.

Still another object of the invention is to provide a row marker which is readily adjustable so as to adjust the space between markings.

Still a further object of the invention is to provide a row marker which may be attached to a tractor or an implement with a minimum of bolts, and with the use of a minimum of control connections.

Another object of the invention is to provide a row marker which may be moved from one side to the other of the tractor or implement, by the use of a single fluid actuated cylinder.

With these objects in mind, and others which will become manifest as the description proceeds, reference is to be had to the accompanying drawings, in which like reference characters designate like parts in the several views thereof; in which FIG. 1 is a top plan view of a row marker shown in full outline, a tractor shown in dashed outline, with an alternate position of the row marker also being shown in dashed outline;

FIG. 2 is an enlarged, fragmentary view of the hydraulic cylinder mechanism, mounting bracket and a portion of the row marker;

FIG. 3 is an enlarged, perspective view of a bell-crank arrangement to enable the row marker to be readily moved past dead top center;

FIG. 4 is a perspective view of the row marker, shown in full outline, attached to the forward end of a tractor, a fragmentary portion of which is shown in dashed outline;

FIG. 5 is a front elevational view of the row marker attached to a tractor, which row marker is shown in full outline in one position and in dashed outline in two alternate positions;

FIG. 6 is an enlarged, fragmentary view of the disc end of the row marker, with portions being shown in dashed outline;

Figure 7:
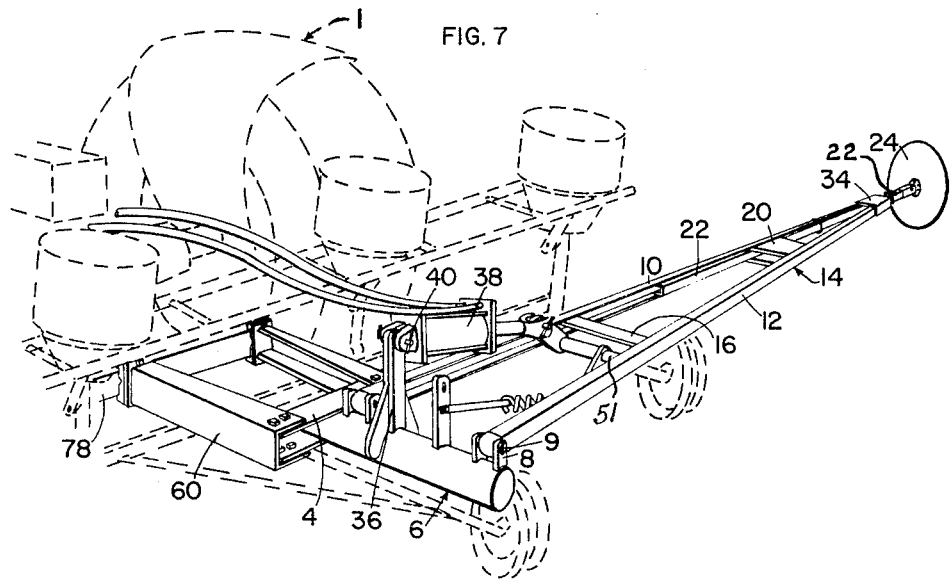
Figure 8:
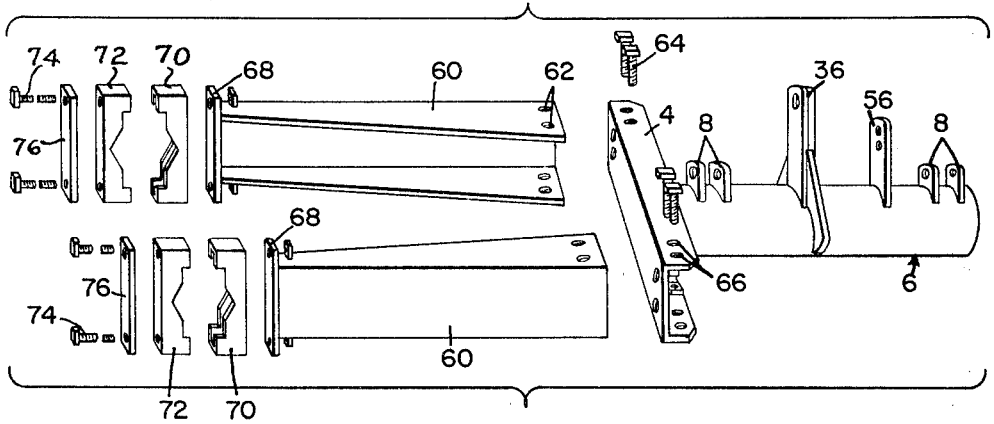

FIG. 7 is a perspective view showing the row marker attached to an implement, which implement is attached rearwardly of the tractor, with the row marker being shown in full outline, the adapter conversion kit shown in full lines, and with the implement and the tractor being shown in dashed outline; and FIG. 8 is an enlarged, exploded view of the row marker mounting member, showing the brackets for mounting the marker on the rear portion of an implement, such as the tool bar thereof.

With more detailed reference to the drawing, the numeral 1 designates generally a tractor of the conventional farm type which has the usual hydraulic or fluid actuated system for actuating farm implements which are usually used in connection therewith. The numeral 2 designates a forwardly extending row marker which has a support member 4, which is usually a structural member, such as a channel, to which is secured an outwardly extending row marker mounting member 6. The mounting member 6 has a pair of upstanding lugs 8 on each end thereof, which lugs are apertured to receive pins 9 therethrough. Outwardly extending members 10 and 12 which forms a row marker arm 14 have their respective inner ends between pairs of upstanding lugs 8, the members 10 and 12 are apertured to receive the pins 9 therethrough and through lugs 8 to form a hingeable joint. The hingeable joint is formed between row marker mounting member 6 and the arm 14. The arm 14 is braced by transverse braces 16 and 20, at spaced intervals within the length thereof. The member 10 of the arm 14 is a channel member and has a channel member 22 received therein in sliding relation which member 22 mounts a row marker disc 24, which is journaled on the outer end of the channel 22, as will best be seen in FIG. 6. The row marker disc 24 is detachably secured to the outer end of channel member 22 by a bolt and nut arrangement 26 which passes through a loop 28 which is secured to the outer end of the channel member 22. The channel member 22 is held in secure relation within channel 10 by clamps 30, which bindingly engage the channels 10 and 22 against longitudinal movement, when the clamps are tight. The bearings on disc 24 are encased in a dust-tight casing 32 and rotate about the bolt of bolt and nut arrangement 26 as an axis.

This arrangement enables a disc and bearing assembly to be readily removed and replaced in a minimum of time. The outer ends of channel members 10 and 12 converge and have an opening therebetween to permit the channel 22 to be readily slidable therethrough. The channels are held together in secure relation by plates 34 secured thereto as by welding, one of which plates is on each side of the channels 10 and 12 being joined. The channel 4, to which arm mounting member 6 is secured as by welding, preferably has a multiple arrangement of holes therein to enable the unit to be used either on the forward end of a tractor or on adapter bars which enables the device to be mounted on the tool bar of a cultivator, planter or the like, which tool bar is attached to the rear of a tractor and is operated by the power take-off thereof. The row marker arm is raised and lowered by a fluid actuated cylinder, which is preferably hydraulically powered, as supplied by the conventional tractor. The mounting member 6 has an upwardly extending arm 36 thereon, which is preferably vertical and has pivotal connection means thereon, such as an aperture near the upper end thereof to pivotally mount a fluid cylinder 38 which has pivotal connection means thereon, a pin 40 passing through apertured lugs within the fluid cylinder 38 and through the apertures within the upstanding arm 36. The plunger 42 of the fluid actuated cylinder 38 has a clevis 44 thereon which connects to lever 46 of the bellcrank, designated generally by the numeral 48, which bellcrank has a second lever 50 thereon to which a tension spring 52 is connected. The tension spring 52 has the other end thereof connected to a clevis 54 which is pivotally mounted on a second upstanding arm 56, mounted on outwardly extending mounting member 6.

The bell-crank 48, which comprises arms 46 and 50 has the arms thereof secured to a tubular member 47 which mounts on a shaft 51 which shaft extends between the members 10 and 12, as will best be seen in FIGS. 2 and 3.

The arms 46 and 50 of the bell-crank 48 are approximately 90 degrees apart, which enables the fluid actuated cylinder 38 and plunger 42 to raise the arm 14 from the position, as indicated at A in full outline, FIG. 5, to the position B, as when the arm is moved rapidly upward about the axes of pins 9, spring 52 and the inertia will carry the arm 14 past position B and over dead center, so the arm 14 may be lowered to the position indicated at C, in dashed outline. The spring 52 cushions the movement from one side of dead top center to the opposite side of dead top center, FIG. 5, whereupon, the fluid cylinder 38 and plunger 42 may be operated to lower the arm 14 to the desired marking position. The desired pressure may be applied to the marker disc 24 by adjusting the clevis 54 with respect to a second upstanding arm 56 to urge the disc into the soil or to counterbalance the arm 14 to allow a floating action without movement of plunger in cylinder 38, as the tractor 1 moves across a field to enable the use on rough terrain. The fluid cylinder 38 has conduits 39 leading therefrom to a suitable source of fluid power, such as hydraulic power, which is usually present on farm tractors and the like.

The hydraulic cylinder 38 and spring balance 52 are attached to the clevis 54 on a 90 degree angle, from the center point of the pivot, to partially counter-balance arm 14. The balance spring 52 performs several functions; it balances weight on the marking disc 24, it absorbs shock when the marker is reversed, and it allows the marker to float at all times, even though the cylinder is stationary.

FIGS. 1 through 5 show the row marker mounted on the forward end of the tractor 1 by bolts 58 which enables the row marker to be readily removed and replaced, as desired. This arrangement enables the row marker to be removed as a unit, and replaced as a unit, without having to assemble this piece by piece on an implement or tractor, as has been the usual practice heretofore in attaching row markers.

MODIFIED FORM OF INVENTION

A modified form of the invention is shown in FIGS. 7 and 8, which utilizes the same row marker, which has an outwardly extending arm 14 and a marker disc 24, which is mounted on an outwardly extending member 6 which is secured to a structural member 4. However, the present arrangement enables the structural member 4 to be secured to rearwardly extending arms 60 which have holes 62 therein to complementally receive bolts 64 therethrough and through holes 66 in structural member 4 as will be seen in FIGS. 7 and 8. The rearwardly extending arms 60 each has a flange 68 on the rear end thereof which flanges are apertured to receive clamp members 70 thereagainst, which clamp members 70 are complemental with clamp members 72, so upon passing bolts 74 through apertures in apertured bar 76 the bolts will pass through apertures in complementary clamp members 70 and 72 and apertures in flange 68 to bindingly engage the clamps 70 and 72 to a tool bar 78 of a planter, or the like.

The particular clamp is conformable to square tool bars and can be bolted on the face thereof, or to rectangular bars to be bolted to clamp between the corners thereof, and when clamped in place will support the mounting member 6 rearwardly of the implement and tractor in such manner that the arm 14 will extend outward from the pivot pins 9 and is operable by the fluid cylinder 38 for movement in the same manner as illustrated in FIG. 5, as being mounted on the forward end of the tractor.

Having thus clearly shown and described the invention, what is claimed as new and desired to be secured by Letters Patent is:

1. A marker for movement over the terrain by a tractor, which marker comprises;
    (a) a mounting member connected to the tractor,
    (b) a marker arm pivotally mounted, at one end, on said mounting member,
    (c) a marker element mounted near the outer end of said marker arm,
        (1) said marker element being adapted to be moved into opposite positions to selectively engage the ground when the marker arm is in an outwardly extending, ground engaging position on either side of a vertical, medial plane taken longitudinally through the tractor,
    (d) a fluid actuated cylinder pivotally mounted on said mounting member,
        (1) fluid conduits connected with said fluid actuated cylinder for selective, powered operation thereof by the operator from the tractor seat,
        (2) a plunger associated with said fluid actuated cylinder, which plunger has pivotal connection means on the outer end portion thereof,
    (e) a first outwardly extending lever mounted in journaled relation to said marker arm transversely to the axis thereof,
        (1) pivotal connection means on said lever near the outer end thereof,
    (f) a second outwardly extending lever operatively secured to said first outwardly extending lever at an angle with respect thereto and being movable therewith,
        (1) pivotal connection means on said second outwardly extending lever near the outer end thereof,
        (2) said plunger being pivotally connected with said first outwardly extending lever by said pivotal connection means,
        (3) restraining means interconnected between said mounting member and said second outwardly extending lever,
(4) said marker arm being pivotally movable from one marking position to a position near the vertical medial plane, and
(5) said marker arm adapted to be moved to a position on the opposite side of said vertical, medial plane by the inertia of the moving marker arm.

2. A marker as defined in claim 1; wherein
(a) a shaft, including said second outwardly extending lever, is pivotally mounted on said marker arm transversely thereof, and
(b) said restraining means is a spring interconnected between said mounting member and said second outwardly extending lever to limit the pivotal movement of said second outwardly extending lever with respect to said marker arm.

3. A marker as defined in claim 2; wherein
(a) said spring, which limits the pivotal movement of said second outwardly extending lever, supports said marker arm in resilient relation with respect to the terrain.

4. A marker as defined in claim 1; wherein
(a) said restraining means interconnected between said mounting member and said second outwardly extending lever is a spring.

5. A marker as defined in claim 1; wherein
(a) said marker arm comprises two spaced apart members, the inner ends of which are pivotally mounted on said mounting member, on an axis parallel with the longitudinal axis of the tractor,
   (1) said spaced apart members of said marker arm extend outwardly, the outer ends of which converge,
(b) a further member fitted between the outer ends of said spaced apart members and is longitudinally slidable therebetween,
(c) said marker element being mounted on said further member, which is longitudinally slidable, with respect to said spaced apart members forming said marker arm, and
(d) fastening means fixedly securing said further member in fixed relation to said spaced apart, outwardly extending members.

6. A marker as defined in claim 1; wherein
(a) said mounting member, pivotally mounting said marker arm assembly, is detachably connected to the tractor as a unit, and
   (1) said mounting member being positioned within a vertical medial plane passing longitudinally through the tractor.

7. A marker as defined in claim 5; wherein
(a) said spaced apart members of said marker arm include a transverse shaft mounting said first outwardly extending lever,
(b) a second outwardly extending lever connected to said transverse shaft for unitary movement therewith, and
(c) a spring connected at one end to said mounting member, the other end of said spring being connected to said second outwardly extending lever and being biased therebetween, so, upon outward movement of said marker arm on either side of the vertical plane, by movement of said plunger in said cylinder, the plunger in said cylinder, connected between said mounting member and said first outwardly extending lever, will move said second outwardly extending lever sufficiently to stretch said spring to move said marker arm from one side of the vertical medial plane passing longitudinally through the tractor, to the opposite side of said plane, after the cessation of movement of said plunger.

References Cited

UNITED STATES PATENTS

| 1,116,381 | 11/1914 | Carney | 172—132 |
| 2,073,879 | 3/1937 | Ritchie | 172—132 |
| 3,174,556 | 3/1965 | Knapp et al. | 172—225 |

ROBERT E. BAGWILL, Primary Examiner

STEPHEN C. PELLEGRINO, Assistant Examiner

U.S. Cl. X.R.

172—225